(12) United States Patent
Pflueger et al.

(10) Patent No.: US 10,700,316 B2
(45) Date of Patent: Jun. 30, 2020

(54) BATTERY HOUSING, BATTERY COMPRISING A BATTERY HOUSING OF THIS TYPE, SHEET ELEMENT FOR PRODUCING A BATTERY HOUSING OF THIS TYPE, AND METHOD FOR PRODUCING A BATTERY HOUSING OF THIS TYPE

(71) Applicant: Robert Bosch GmbH, Stuttgart (DE)

(72) Inventors: Claus Gerald Pflueger, Markröningen (DE); Klaus Wipfler, Niefern-Oeschelbronn (DE)

(73) Assignee: Robert Bosch GmbH, Stuttgart (DE)

( * ) Notice: Subject to any disclaimer, the term of this patent is extended or adjusted under 35 U.S.C. 154(b) by 94 days.

(21) Appl. No.: 15/560,712

(22) PCT Filed: Feb. 25, 2016

(86) PCT No.: PCT/EP2016/053941
§ 371 (c)(1),
(2) Date: Sep. 22, 2017

(87) PCT Pub. No.: WO2016/150640
PCT Pub. Date: Sep. 29, 2016

(65) Prior Publication Data
US 2018/0083238 A1 Mar. 22, 2018

(30) Foreign Application Priority Data
Mar. 26, 2015 (DE) .......................... 10 2015 205 485

(51) Int. Cl.
| | | |
|---|---|---|
| *H01M 2/10* | (2006.01) | |
| *H01M 10/613* | (2014.01) | |
| *H01M 2/20* | (2006.01) | |
| *H01M 10/655* | (2014.01) | |
| *H01M 10/647* | (2014.01) | |

(52) U.S. Cl.
CPC ....... *H01M 2/1072* (2013.01); *H01M 2/1022* (2013.01); *H01M 2/206* (2013.01); *H01M 10/613* (2015.04); *H01M 10/655* (2015.04); *H01M 2/1061* (2013.01); *H01M 10/647* (2015.04); *H01M 2220/20* (2013.01)

(58) Field of Classification Search
CPC .......................... H01M 2/206; H01M 2220/20
See application file for complete search history.

(56) References Cited

U.S. PATENT DOCUMENTS

| | | |
|---|---|---|
| 3,381,880 A | 5/1968 | Lewallen et al. |
| 2006/0216577 A1 | 9/2006 | Cheng |
| 2012/0003505 A1 | 1/2012 | Kim |
| 2012/0045686 A1 | 2/2012 | Jung |
| 2013/0224547 A1 | 8/2013 | Ahn |
| 2015/0280186 A1* | 10/2015 | Fan ..................... H01M 2/1005 429/159 |

FOREIGN PATENT DOCUMENTS

| | | |
|---|---|---|
| CN | 102642477 A | 8/2012 |
| DE | 102008026371 | 12/2008 |
| DE | 102009052975 | 5/2011 |
| DE | 102009058809 | 6/2011 |
| DE | 102013008588 | 12/2014 |
| EP | 2337141 A1 | 6/2011 |
| GB | 848050 A | 9/1960 |
| GB | 2213981 | 8/1989 |
| JP | H0478757 A | 3/1992 |
| JP | 2006286357 | 10/2006 |

OTHER PUBLICATIONS

International Search Report for Application No. PCT/EP2016/053941 dated Apr. 28, 2016 (English Translation, 3 pages).

\* cited by examiner

*Primary Examiner* — Ladan Mohaddes
(74) *Attorney, Agent, or Firm* — Michael Best & Friedrich LLP (57) ABSTRACT

The invention relates to a battery housing for receiving at least one battery unit (46) comprising a first housing wall (2) and a second housing wall (3), characterized in that the first housing wall (2) forms a first securing element (4) and the second housing wall (3) forms a second securing element (5) which are formed in such a way that the first securing element (4) and the second securing element (5) are reversibly connected to one another for fixing the first housing wall (2) relative to the second housing wall (3).

11 Claims, 8 Drawing Sheets

BATTERY HOUSING, BATTERY COMPRISING A BATTERY HOUSING OF THIS TYPE, SHEET ELEMENT FOR PRODUCING A BATTERY HOUSING OF THIS TYPE, AND METHOD FOR PRODUCING A BATTERY HOUSING OF THIS TYPE

BACKGROUND OF THE INVENTION

The invention is based on a battery housing for receiving at least one battery unit, having a first housing wall and a second housing wall. The subject matter of the present invention is also a battery having a battery housing of this type, a plate element for producing a battery housing of this type and a method for producing a battery housing of this type.

While operating a battery cell, chemical processes in the interior that are referred to as swelling lead to a volume expansion of the battery cell. These expansion procedures are to be taken into account when designing and embodying a battery cell housing.

The publication DE 10 2013 008 588 A1 discloses a receiving housing for receiving multiple electrical energy storage devices in an energy storage device receiving chamber having a trough-shaped or tub-shaped design that is delimited by means of a base face or base wall and a plurality of side faces or side walls. Moreover, the base face and the plurality of side faces can be embodied as a single part or as separate components that are connected to one another, wherein in the case of a single-part embodiment of the receiving housing, said housing is embodied as a deep-drawn part or, folding part or injection molded part. Furthermore, the components or material sections that form the base face and/or the plurality of side faces are in particular welded together to form a sealing arrangement of the energy storage device receiving chamber.

SUMMARY OF THE INVENTION

The battery housing and the method for producing a battery housing of this type according to the invention, have the advantage that a joining method is not required in the case of a reversible connection. In contrast thereto, joining methods, such as in particular a welding or soldering method, lead to irreversible material changes of the first housing wall and/or the second housing wall in the case of an irreversible permanent connection. In contrast, the reversible connection requires working steps with minor material deformation.

In accordance with the invention, a battery housing is provided that comprises a first housing wall and a second housing wall. The first housing wall forms a first fastening element and the second housing wall forms a second fastening element. Advantageously, the first fastening element and the second fastening element are embodied in such a manner that the first fastening element and the second fastening element are connected to one another in a reversible manner to form a fixing arrangement of the first housing wall relative to the second housing wall so that this reversible connection ensures a reliable mechanical stability of the connection of two housing walls of the battery housing during operation. Consequently, it is possible for the housing walls to counteract forces that are based on a swelling of a battery unit without detaching the fixing arrangement of the first housing wall relative to the second housing wall. Moreover, it is possible to separate the first fastening element and/or the second fastening element whilst causing such minor damage that another reversible connection and where appropriate a re-use of the battery cell housing is possible. A reversible connection within the scope of this invention means that a fastening element is damaged to such a small extent when producing the reversible connection that it is possible to separate the reversible connection and reproduce the connection. In particular, in the case of a cold connecting technique this has the advantage that as a consequence it is possible to produce the battery cell housing in short procedure times and with a highest degree of accuracy. Furthermore, the introduction of contaminants is reduced.

In particular, the first fastening element is embodied as a through-going aperture that extends through the first housing wall and/or the second fastening element is embodied as a lamella element on the second housing wall. Furthermore, the first housing wall and the second housing wall can be additionally welded to one another after making the reversible connection in order to seal the battery housing.

It is advantageous if the battery housing comprises at least one third housing wall. The third housing wall is connected as a single part or irreversibly connected to the first housing wall and/or to the second housing wall. A permanent connection of the third housing wall to the first housing wall and/or the second housing wall is thereby ensured in a reliable manner. Moreover, the battery housing is sealed at this site in such a manner that there is no danger of materials escaping and/or penetrating said housing. In particular, the irreversible connection is welded.

Furthermore, it is advantageous if the first housing wall or the second housing wall or the third housing wall forms a third fastening element. Moreover, the battery housing comprises a cover that forms a fourth fastening element. The fourth fastening element is connected in a reversible manner to a third fastening element so as to fix the cover relative to the first, second or third housing wall. This has the advantage that a reversibly fastened cover can close the battery housing, in particular can only close said battery housing in part, or can cover housing walls, in particular can only cover said housing walls in part. Consequently, it is possible using the cover to protect specific elements of the battery such as by way of example electrical connectors, in particular during operation, against environmental influences or mechanical loading. Furthermore, a simple disassembly and re-assembly of the cover provides the possibility of efficient maintenance of battery elements without causing extensive damage to the battery housing.

In particular, the first fastening element, the second fastening element, the third fastening element or the fourth fastening element is embodied as a through-going aperture that extends through the first housing wall, the second housing wall, the third housing wall or the cover. Furthermore, in particular the first fastening element, the second fastening element, the third fastening element or the fourth fastening element is embodied as a lamella element on the first housing wall, the second housing wall, the third housing wall or the cover.

Expediently, a cooling element is arranged on a housing wall of the battery housing. Furthermore, said housing wall is embodied in such a manner that it extends in a concave manner remote from the cooling element so that a contact surface is ensured between the housing wall and at least one battery unit that is received in the battery housing. In particular, the concave curvature of the housing wall is a resilient element that can in part be deformed in a reversible manner. A swelling of the battery units that are received in the battery housing causes an enlargement of the contact surface between a battery unit and the housing wall. Furthermore, as a consequence the resilient element is deformed and consequently the concave curvature is reduced. Consequently, a reliable transfer of energy and/or a fixing arrangement of the battery units in their position is ensured in particular by means of the embodiment of the housing wall.

In accordance with a further idea of the invention, a resilient element that can be at least in part deformed in a reversible manner is arranged in the battery housing. This resilient element is used for the purpose of rendering it possible for the battery units to expand in a desired manner. The resilient element to a great extent determines the rate of expansion as a result of the force that is exerted on a battery unit. Furthermore, the expansions of the battery units to a great extent only cause a deformation of the resilient element and thereby reduce the mechanical loading for the other housing walls. It is thus possible to reduce wall thicknesses and to save material.

In this case, it is advantageous that at least one housing wall forms a stop element or a stop element is inserted into the battery housing, wherein the stop element is used to form a delimitation of the deformation of the resilient element. The deformation of the resilient element and thereby the expansion of the battery units can thus be delimited to a desired extent.

Furthermore, the invention relates to a battery having a battery housing in accordance with the invention. It is thereby advantageously possible to arrange battery units in the battery housing so that in particular in the case of a desired volume expansion, the mechanical stability of the battery housing is ensured.

Furthermore, it is advantageous if a housing wall of the battery housing comprises at least one aperture for arranging a cell terminal. As a consequence, a cell connector can thus be arranged in the housing in such a manner that battery units that are received in the battery housing are electrically connected. The connection of the cell connector to a battery unit is embodied in an integrally bonded manner, in particular is welded or bonded. It is consequently possible to arrange multiple battery units in the housing so as to provide protection against environmental influences and to connect said battery units to the surrounding area solely by means of cell terminals. In particular, the cover comprises an aperture for arranging a cell terminal. Furthermore, the cover can be used for the purpose of protecting elements of the battery against physical contact.

A further invention relates to a plate element embodied from metal and/or plate material, said plate element being suitable for producing a battery housing. This plate element comprises at least one bend-supporting line that is embodied by means of a plurality of through-going apertures that extend through the plate element. Furthermore, the plate element comprises a first plate segment that forms a first fastening element, and a second plate segment that forms a second fastening element. The first fastening element, the second fastening element and the at least one bend-supporting line are embodied in such a manner that the plate element is bent along the at least one bend-supporting line to form a reversible connection of the first fastening element to the second fastening element. The bend-supporting line renders possible a desired and exact bend of the plate element in a simplified manner. Furthermore, it is possible that a bending procedure is supported by means of the bend-supporting line.

In particular, the plate element is a planar component. Consequently, said plate element can be produced by way of example from a stamping part. Furthermore, it is also possible to produce the component as a laser cut part. In particular, the through-going apertures that extend through the plate element and can form the bend-supporting line can be produced by means of laser cutting. In particular, it is furthermore possible to produce the material weaknesses that can form the bend-supporting line by means of stamping. In contrast to deep-drawn housings or injection molded housings, the production of the battery housing from the plate element is comparatively simple, cost-effective and quick. Furthermore, in particular the first fastening element is also embodied as a through-going aperture that extends through the first plate segment, and/or the second fastening element is embodied as a lamella element on the second sheet segment. The plate element is produced from metal and/or plastic material or includes metal and/or plastic material. Furthermore, the plate element comprises a thickness by way of example of 0.1 mm to 5 mm, preferably a thickness of 0.5 mm to 2 mm and in particular a thickness of 1 mm to 1.5 mm.

Moreover, the invention relates to a method for producing a battery housing in accordance with the invention from such a plate element. The first plate segment and the second plate segment are to be bent towards one another along at least one bend-supporting line to form a reversible connection of the first fastening element to the second fastening element. Consequently, the connection of the first fastening element and the second fastening element to one another can be reliably ensured by means of bending the plate element in a precise manner. Furthermore, this procedure omits an additional joining step and reduces production costs and/or production time.

Furthermore, it is expedient that the plate element embodies a third fastening element. The battery housing is connected to a cover that embodies a fourth fastening element. The battery housing is connected to the cover in a reversible manner by means of a reversible connection of the fourth fastening element to the third fastening element. This has the advantage that the cover can be connected in a reversible manner to the battery housing and the cover can be disassembled without being damaged.

BRIEF DESCRIPTION OF THE DRAWINGS

Exemplary embodiments of the invention are illustrated in the drawings and are further explained in the description hereinunder.

In the drawings

DETAILED DESCRIPTION

Figure 1:
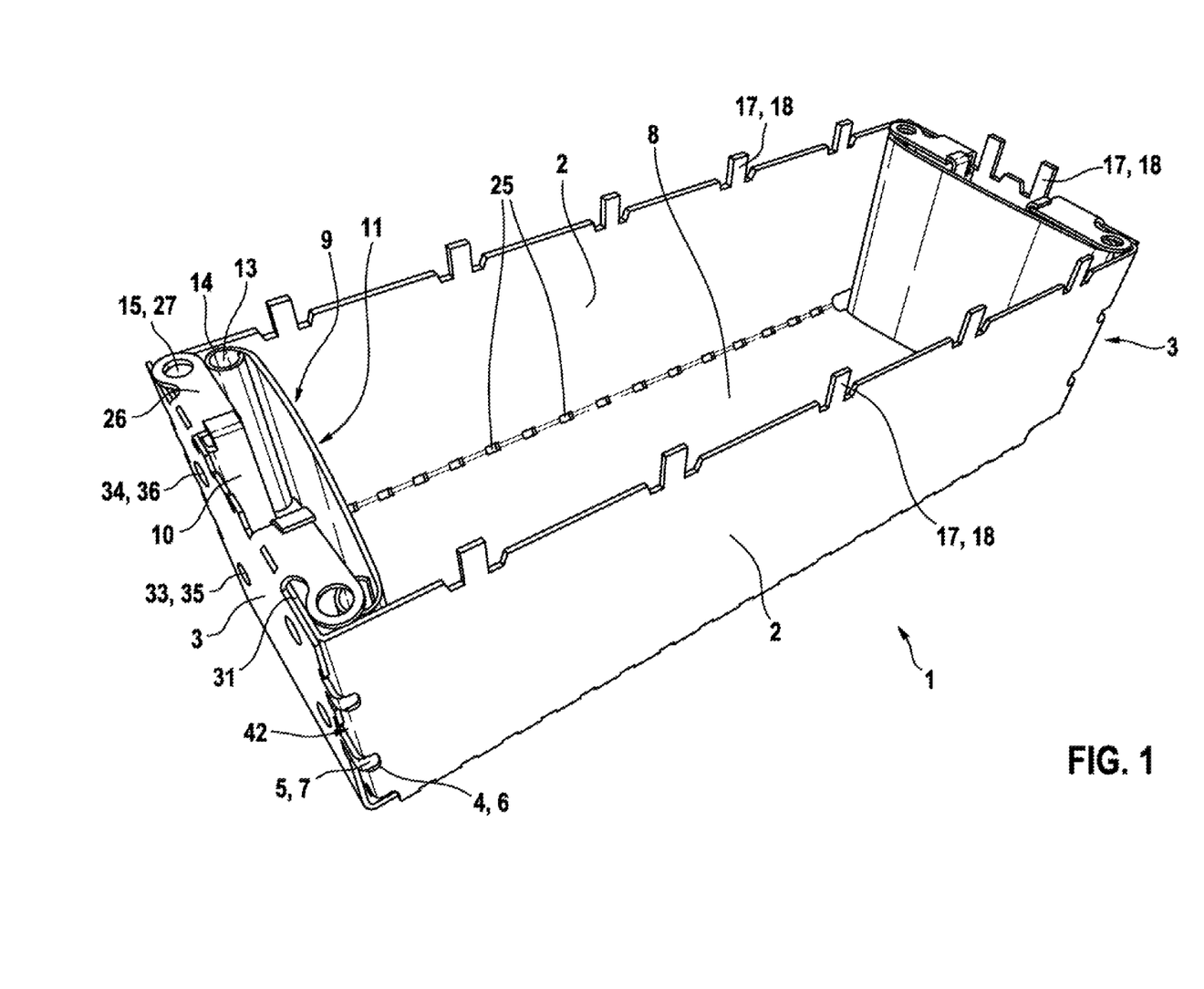
FIG. 1 illustrates in a perspective view an embodiment of a battery housing in accordance with the invention.

FIG. 1 illustrates in a perspective view an embodiment of a battery housing 1 in accordance with the invention.

The battery housing 1 is used for receiving at least one battery unit 46 that is not illustrated in FIG. 1. In particular, the battery unit 46 is a battery cell or a battery module that is composed of multiple battery cells.

The battery housing 1 comprises a first housing wall 2 and a second housing wall 3. The first housing wall 2 forms a first fastening element 4 that in particular, as is illustrated in FIG. 1, is embodied as a first through-going aperture 6 that extends through the first housing wall 2. Furthermore, the second housing wall 3 forms a second fastening element 5 that in particular, as is illustrated in FIG. 1, is embodied as a first lamella element 7.

The first housing wall 2 is fixed relative to the second housing wall 3 owing to the connection of the first fastening element 4 and the second fastening element 5. In accordance with the invention the first fastening element 4 and the second fastening element 5 are connected in a reversible manner to one another.

In order to produce the battery housing 1, the first lamella element 7 is bent and/or deformed, in particular while the first housing wall 2 and the second housing wall 3 are moved and/or rotated relative to one another so that the first lamella element 7 can be pushed into the first aperture 6 and finally, as is evident in FIG. 1, is embodied extending through the first aperture 6 in such a manner that the first housing wall 2 and the second housing wall 3 are fixed relative to one another.

In order to produce the above described reversible connection, it is preferably provided to deform or bend the first lamella element 7 after sliding the first lamella element 7 into the first aperture 6, by way of example using pincers. This leads, in particular in comparison to a welding method or soldering method, to minor material damage so that the connection of the first fastening element 4, in particular of the first aperture 6, to the second fastening element 5, in particular to the first lamella element 7, can be separated again without notably damaging the first housing wall 2 and the second housing wall 3. Furthermore, an additional, irreversibly joining method, in particular a welding method or soldering method is not required, wherein so as to seal the battery housing 1 the first housing wall 2 and the second housing wall 3 can be additionally welded to one another along the first connecting edge 42 that is illustrated in FIG. 1.

As is evident in FIG. 1, the battery housing 1 comprises a third housing wall 8 that is preferably embodied as connected as a single part to the first housing wall 2 and the second housing wall 3. Furthermore, it is possible that the third housing wall 8 is only embodied as connected as a single part to the first housing wall 2 or the second housing wall 3 or that the third housing wall 8 is irreversibly connected, in particular welded, to the first housing wall 2 and/or the second housing wall 3.

Furthermore, FIG. 1 illustrates the arrangement of a resilient element 9 in the interior of the battery housing 1 and said resilient element can be inserted in the battery housing 1. Moreover, it is possible that the battery housing 1 forms the resilient element 9.

The resilient element 9 forms a resilient fastening element 13 that is in particular embodied as a cylindrical hollow body having a fastening wall 14. Furthermore, the battery housing 1 forms a resilient element receiving element 15 that in particular is embodied as a through-going aperture 27 that extends through a supporting wall 26. The resilient element 9 can be inserted into the interior of the battery housing 1 in such a manner that the resilient fastening element 13 and the aperture 27 of the resilient element receiving element 15 are arranged aligned with respect to one another, wherein in particular a pin or bolt that is not illustrated and is arranged in the aperture 27 and in the interior of the cylindrical hollow body provides a connection.

As is illustrated in FIG. 1, the resilient element 9 forms a force-receiving wall 11 that can at least in part be deformed in a reversible manner. The resilient element 9 having the force-receiving wall 11 is the element with the least resistance to deformation in comparison with the other housing walls 2, 3, 8 that form a contact surface with the battery unit 46 (not illustrated). A volume expansion of battery units 46 that are received in the battery housing 1 as a result of swelling during operation consequently lead to a great extent to a deformation of the resilient element 9. As a consequence, the mechanical loading reduces for the other housing walls 2, 3, 8. The embodiment of the resilient element 9, in particular of the force-receiving wall 11, defines the expansion capability of the battery units 46.

Moreover, the battery housing 1 embodies a stop element 10. Furthermore, it is possible that a stop element 10 can be inserted into the battery housing 1.

The stop element 10 and the resilient element 9 are arranged with respect to one another in such a manner that the stop element 10 delimits the deformation of the force-receiving wall 11. Furthermore, the distance between the force-receiving wall 11 and the stop element 10 and/or the spatial embodiment of the stop element 10 determines the extent of the tolerated expansion of the battery units 46.

Furthermore, the battery housing 1 that is illustrated in FIG. 1 comprises by way of example at least one fourth housing wall 31 that is in particular embodied as connected as one single part with the first housing wall 2. The at least one fourth housing wall 31 is moreover arranged in a planar manner parallel on the second housing wall 3. In particular, two fourth housing walls 31 are arranged in a planar manner parallel on the second housing wall 3.

The second housing wall 3 forms a third aperture 33 and a fourth aperture 34 that are embodied as through-going apertures extending through the second housing wall 3. Furthermore, the fourth housing wall 31 embodies a fifth aperture 35 and a sixth aperture 36 that are embodied as through-going apertures that extend through the fourth housing wall 31. The fourth housing wall 31 is arranged on the second housing wall 3 in such a manner that the third aperture 33 is positioned aligned with respect to the fifth aperture 35, wherein in particular a pin or a bolt (not illustrated) provides a connection. Furthermore, the fourth housing wall 31 is arranged on the second housing wall 3 in such a manner that the fourth aperture 34 is positioned aligned with respect to the sixth aperture 36, wherein in particular a pin or bolt (not illustrated) provides a connection.

FIG. 1 illustrates that the first housing wall 2 forms a third fastening element 17 that is embodied as a second lamella element 18.

FIG. 1 illustrates that the second housing wall 3 forms a third fastening element 17 that is embodied as a second lamella element 18.

In particular, it is possible that the third housing wall 8 forms a third fastening element 17 that can be embodied as a second lamella element 18.

The third fastening element 17 is used to provide the reversible connection of the battery housing 1 to a cover 16 that is not illustrated in FIG. 1.

Figure 2:
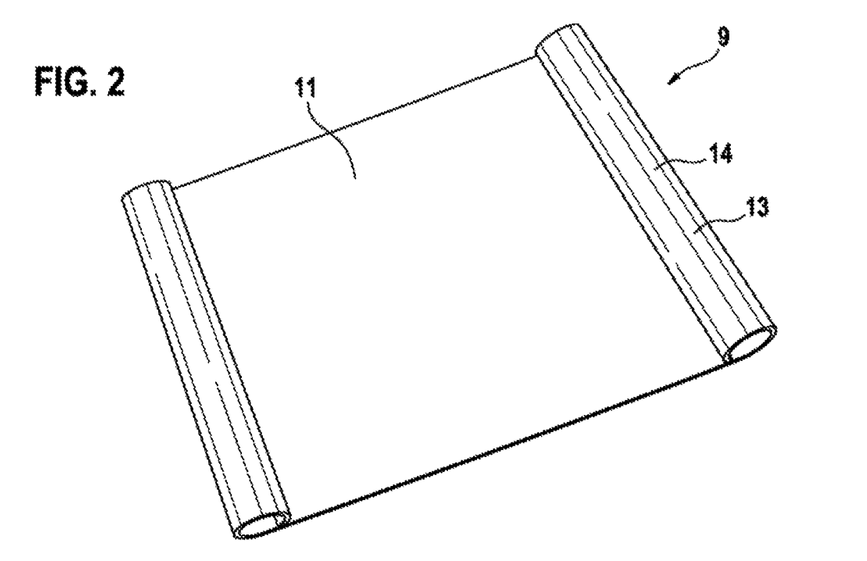
FIG. 2 illustrates in a perspective view an embodiment of a resilient element that can be inserted into the battery housing.

FIG. 2 illustrates an embodiment of a resilient element 9 that can be inserted into the battery housing 1.

The resilient element 9 forms at least one resilient fastening element 13, preferably two resilient fastening elements 13, and said resilient fastening element is embodied, as illustrated in FIG. 2, as a cylindrical hollow body having a fastening wall 14. Furthermore, the resilient element 9 comprises a force-receiving wall 11, wherein the at least one resilient fastening element 13 and the force-receiving wall 11 are embodied in particular as connected as a single part.

The resilient element 9 is advantageously produced from a plate element by means of a suitable bending method.

Figure 3:
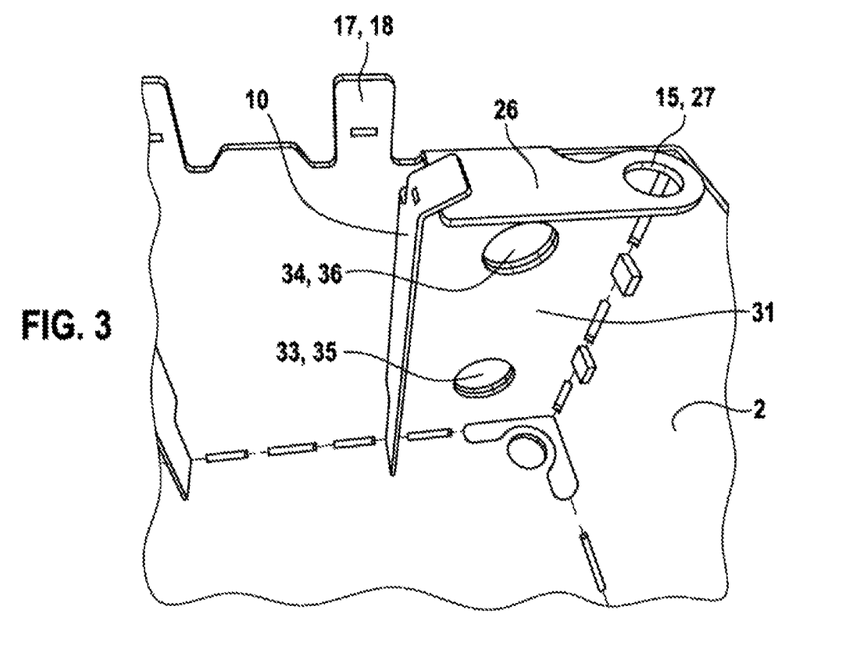
FIG. 3 illustrates in a perspective view an embodiment of a battery housing in accordance with the invention, said battery housing forming a stop element.

FIG. 3 illustrates an embodiment of a battery housing 1 that embodies a stop element 10. Alternatively, it is also possible that a stop element 10 can be inserted into the battery housing 1 in a similar manner to the embodiment in accordance with FIG. 1. It is evident in FIG. 3 that the stop element 10 and the supporting wall 26 form a connection so as to increase the mechanical stability of the stop element 10, in particular this connection can be welded.

Furthermore, FIG. 3 illustrates that the third aperture 33 and the fifth aperture 35 are arranged aligned with respect to one another. Moreover, FIG. 3 illustrates that the fourth aperture 34 and the sixth aperture 36 are arranged aligned with respect to one another.

Figure 4:
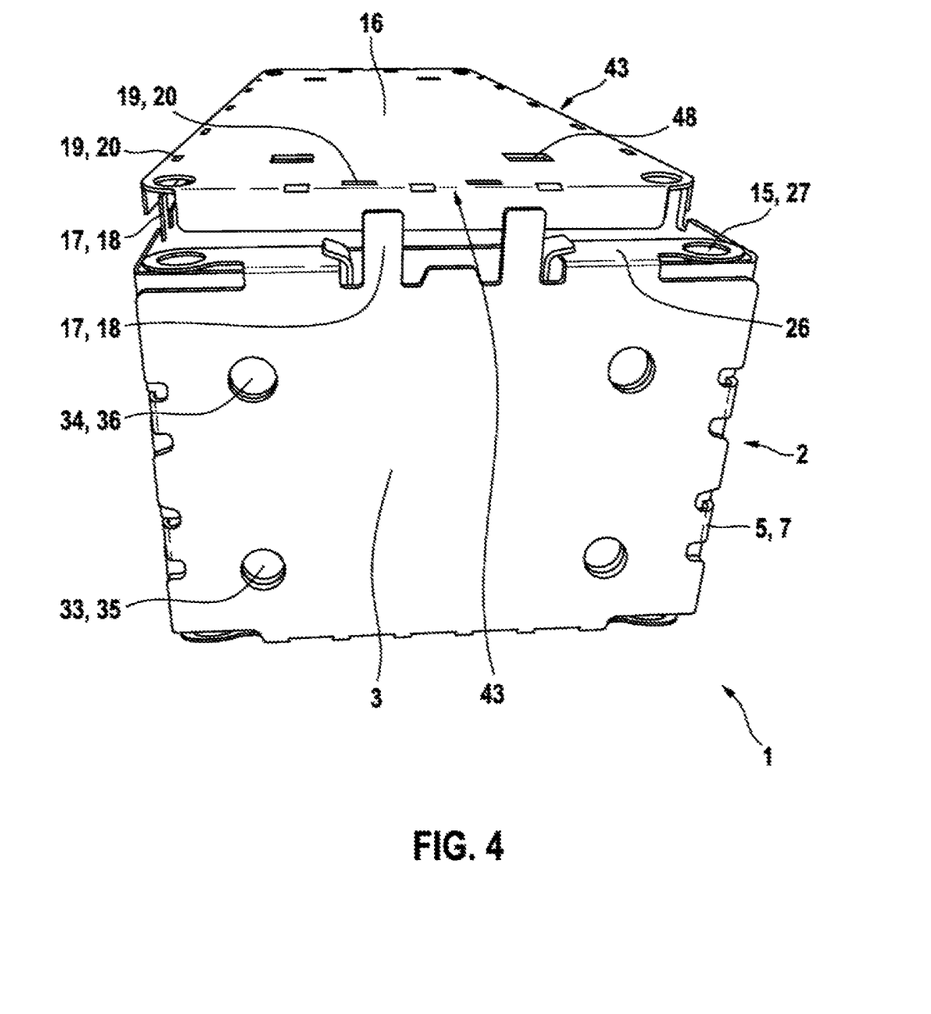
FIG. 4 illustrates in a perspective view a battery housing in accordance with the invention and said battery housing can be closed using a cover.

FIG. 4 illustrates a battery housing 1 in accordance with the invention and said battery housing can be closed using a cover 16.

The cover 16 forms a fourth fastening element 19 that in particular, as is illustrated in FIG. 4, is embodied as a second through-going aperture 20 that extends through the cover 16.

The cover 16 is fixed relative to the first housing wall 2, the second housing wall 3 or the third housing wall 8 owing to the connection of the third fastening element 17 to the fourth fastening element 19. In accordance with the invention, the third fastening element 17 and the fourth fastening element 19 can be connected to one another in a reversible manner.

The second lamella element 18 is thus bent and/or deformed to form a connection of the first housing wall 2 or the second housing wall 3 to the cover 16, in particular while the cover 16 and the first housing wall 2 or the second housing wall 3 are moved and/or rotated relative to one another so that the second lamella element 18 can be pushed into the second aperture 20 and finally said second lamella is embodied in such a manner that it extends through the second aperture 20 in such a manner that the cover 16 and the first housing wall 2, the second housing wall 3 or the third housing wall 8 are fixed relative to one another.

In order to produce the above described reversible connection, it is consequently necessary to deform or bend the second lamella element 18. This leads, in particular in comparison to a welding method or soldering method, to minor material damage so that the connection of the third fastening element 17, in particular of the second lamella element 18, and the fourth fastening element 19, in particular the second aperture 20, can be separated without notably damaging the cover 16.

Furthermore, an additional irreversible joining method, in particular a welding method or soldering method is not required, wherein it is possible to weld the first housing wall 2 or the second housing wall 3 along a second connecting edge 43 that is illustrated in FIG. 4 to the cover so as to form a sealing arrangement.

Figure 5:
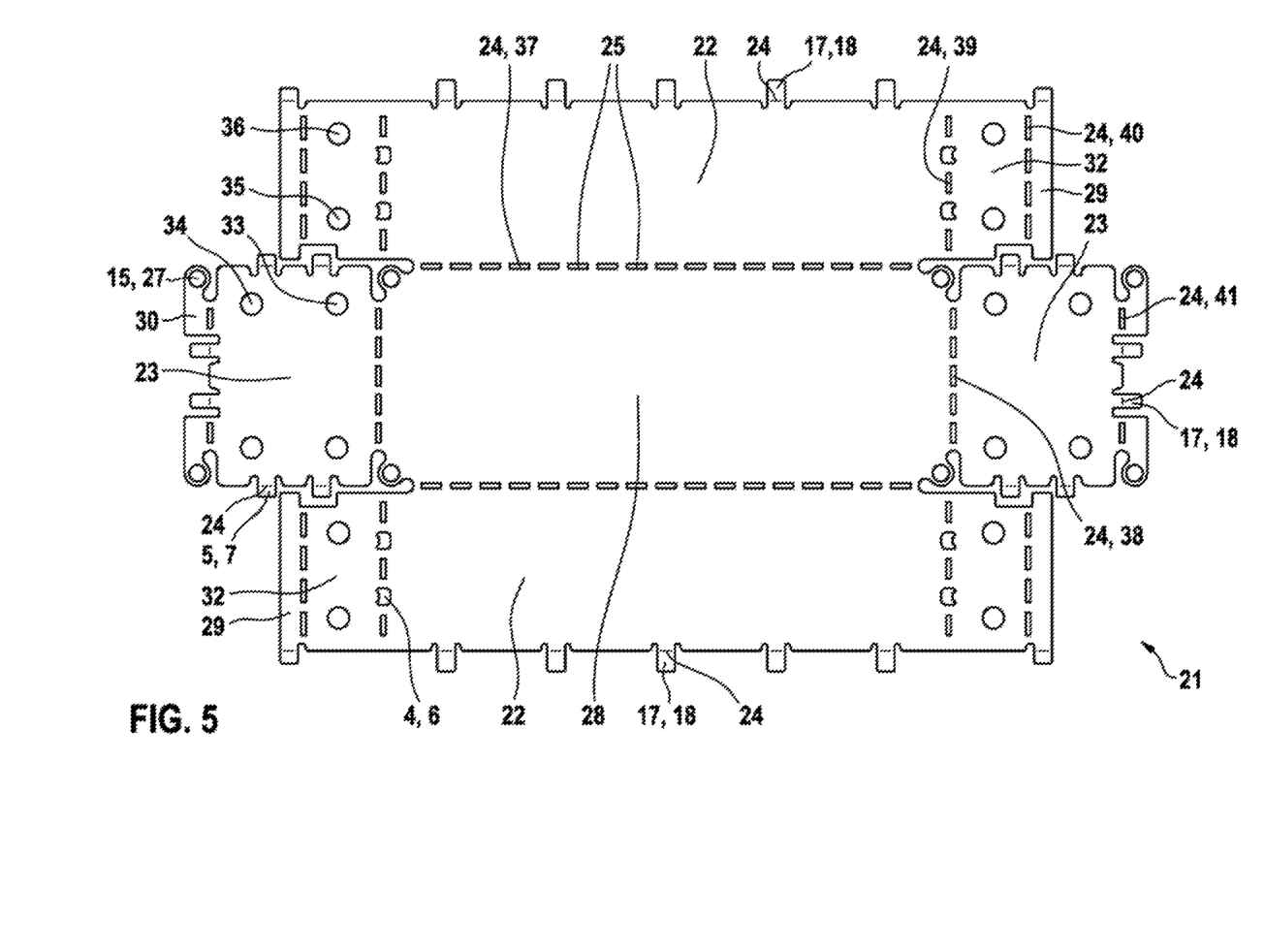
FIG. 5 illustrates an embodiment of a plate element in accordance with the invention that is suitable for producing a battery housing in accordance with the invention.

An embodiment of the plate element 21 in accordance with the invention is illustrated in FIG. 5 and said sheet element is suitable for producing a battery housing 1 in accordance with the invention.

The plate element 21 comprises a first plate segment 22 and a second plate segment 23, wherein after producing the battery housing 1 the first plate segment 22 forms the first housing wall 2 and the second plate segment 23 forms the second housing wall 3.

The first plate segment 22 forms at least one first fastening element 4 that in particular, as is evident in FIG. 5, is embodied as a first through-going aperture 6 that extends through the first plate segment 22. Furthermore, the second plate segment 23 embodies at least one second fastening element 5 that in particular, as is evident in FIG. 5, is embodied as a first lamella element 7.

As is evident in FIG. 5, the sheet element 21 in accordance with the invention comprises a third plate segment 28 that forms the third housing wall 8 after producing the battery housing 1.

Furthermore, the plate element 21 embodies at least one third fastening element 17 that in particular, as is evident in FIG. 5, is embodied as a second lamella element 18. In particular, the first plate segment 22 and/or the second plate segment 23 form a third fastening element 17.

Furthermore, the sheet element 21 forms a fourth plate segment 32, wherein the fourth plate segment 32 forms the fourth housing wall 31 after producing the battery housing 1.

As is evident in FIG. 5, the plate element 21 comprises a stop element segment 29 that forms the stop element 10 in the finished battery housing 1.

Furthermore, FIG. 5 illustrates that the plate element 21 forms a supporting wall segment 30 that forms the supporting wall 26 in the finished battery housing 1. The supporting wall segment 30 forms a resilient receiving element 15 that is embodied in particular as a through-going aperture 27 that extends through the supporting wall segment 30.

The second plate segment 23 forms at least one third aperture 33 and at least one fourth aperture 34 that are embodied in a through-going manner extending through the second plate segment 23. Furthermore, the fourth plate segment 32 forms at least one fifth aperture 35 and at least one sixth aperture 36 that are embodied in a through-going manner extending through the fourth plate segment 32.

In accordance with the invention, the plate element 21 comprises at least one bend-supporting line 24. The at least one bend-supporting line 24 is embodied, as is evident in FIG. 1, by means of a plurality of through-going apertures 25 that extend through the plate element 21, and/or as defined material weaknesses of the sheet element 21.

As is evident in FIG. 5, the plate element 21 comprises at least one bend-supporting line 37 that spatially separates the first plate segment 22 and the third plate segment 28 from one another, a second bend-supporting line 38 that spatially separates the second plate segment 23 and the third plate segment 28 from one another, a third bend-supporting line 39 that spatially separates the first plate segment 22 and the fourth plate segment 32 from one another, a fourth bend-supporting line 40 that spatially separates the fourth plate segment 32 and the stop element segment 29 from one another and a fifth bend-supporting line 41 that spatially separates the second plate segment 23 and the supporting wall segment 30 from one another.

The plate element 21 is bent along the first bend-supporting line 37, the second bend-supporting line 38, the third bend-supporting line 39, the fourth bend-supporting line 40 and the fifth bend-supporting line 41 to produce a battery housing 1 from the plate element 21 in FIG. 5. In particular, it is advantageous to bend initially along the fourth bend-supporting line 40, then along the third bend-supporting line 39, then along the second bend-supporting line 38 and/or along the first bend-supporting line 37 and then along the fifth bend-supporting line 41, preferably in each case at an angle of 90°.

Furthermore, it is possible that, as is illustrated in FIG. 5, the first lamella element 7 and/or the second lamella element 18 comprise a bend-supporting line 24. As a consequence, the production of the reversible connection is to be facilitated.

Figure 6:
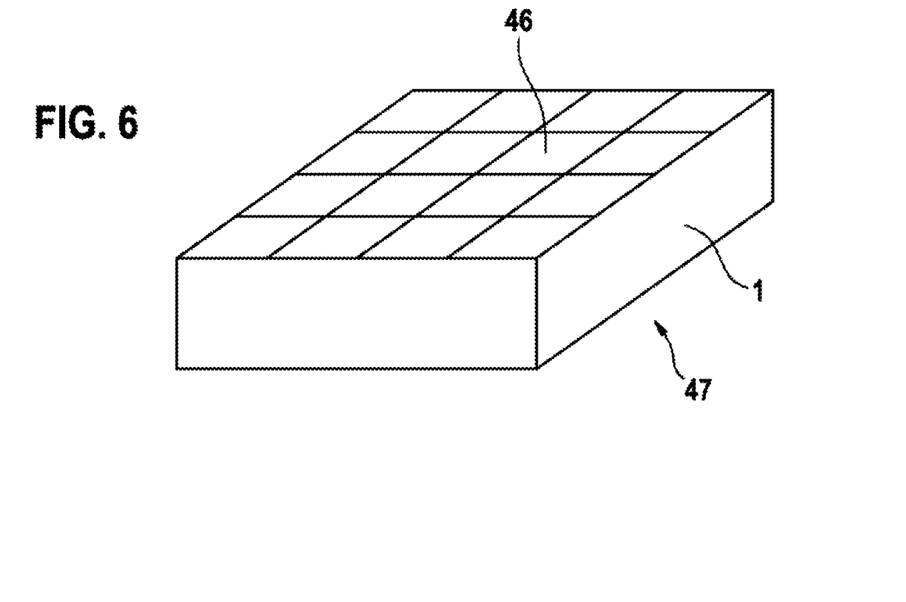
FIG. 6 illustrates in a perspective view an embodiment of a battery having a battery housing in accordance with the invention.

FIG. 6 illustrates a battery 47 having a battery housing 1 in accordance with the invention, wherein at least one battery unit 46 or a plurality of battery units 46 is arranged in the battery housing 1. In particular, the battery unit 46 is a battery cell or a battery module that is assembled from multiple battery cells. Furthermore, the battery housing 1 is preferably closed using a cover 16 (not illustrated).

Figure 7:
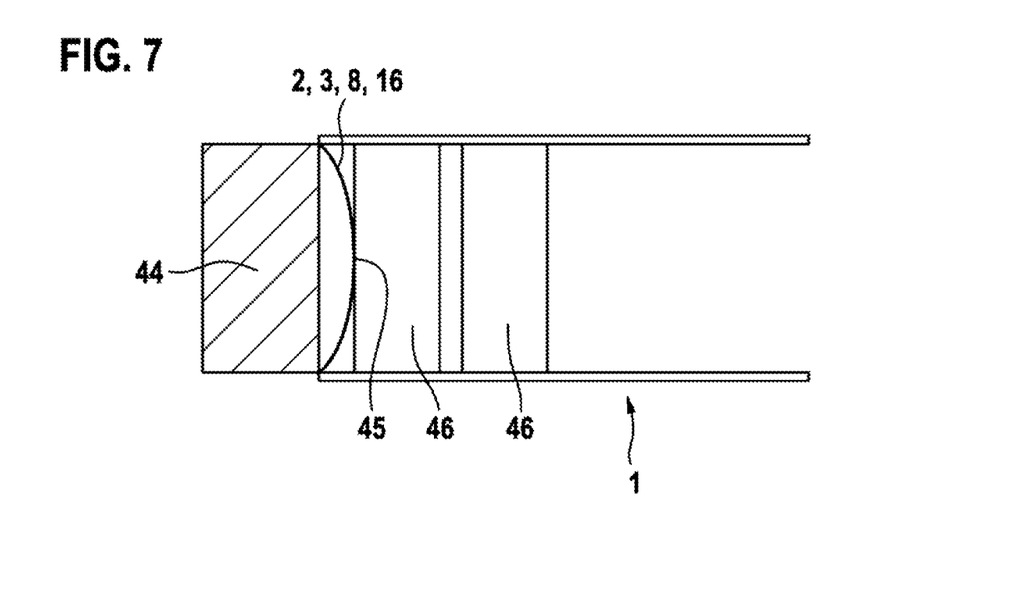
FIG. 7 illustrates in a side view an embodiment of a battery having a battery housing in accordance with the invention and having a cooling element that is arranged on a housing wall.

FIG. 7 illustrates the arrangement of a cooling element 44 on a housing wall of the battery housing 1, in particular the cooling element 44 is arranged on the first housing wall 2, on the second housing wall 3, on the third housing wall 8 or on the cover 16.

Furthermore, FIG. 7 illustrates that the battery units 46 that are received in the battery housing 1 and at least one of the housing walls 2, 3, 8, 16 embody at least one contact surface 45. The at least one housing wall 2, 3, 8, 16 is embodied extending in a concave manner remote from the cooling element 44 in such a manner that at least one contact surface 45 is ensured between the housing wall 2, 3, 8, 16 and at least one battery unit 46.

In the case of a swelling of the battery unit 46, the concave curvature of the at least one housing wall 2, 3, 8, 16 and the at least one housing wall 2, 3, 8, 16 acquires a resilient effect that is used to ensure the transfer of energy and to fix the position of the battery units 46.

Figure 8:
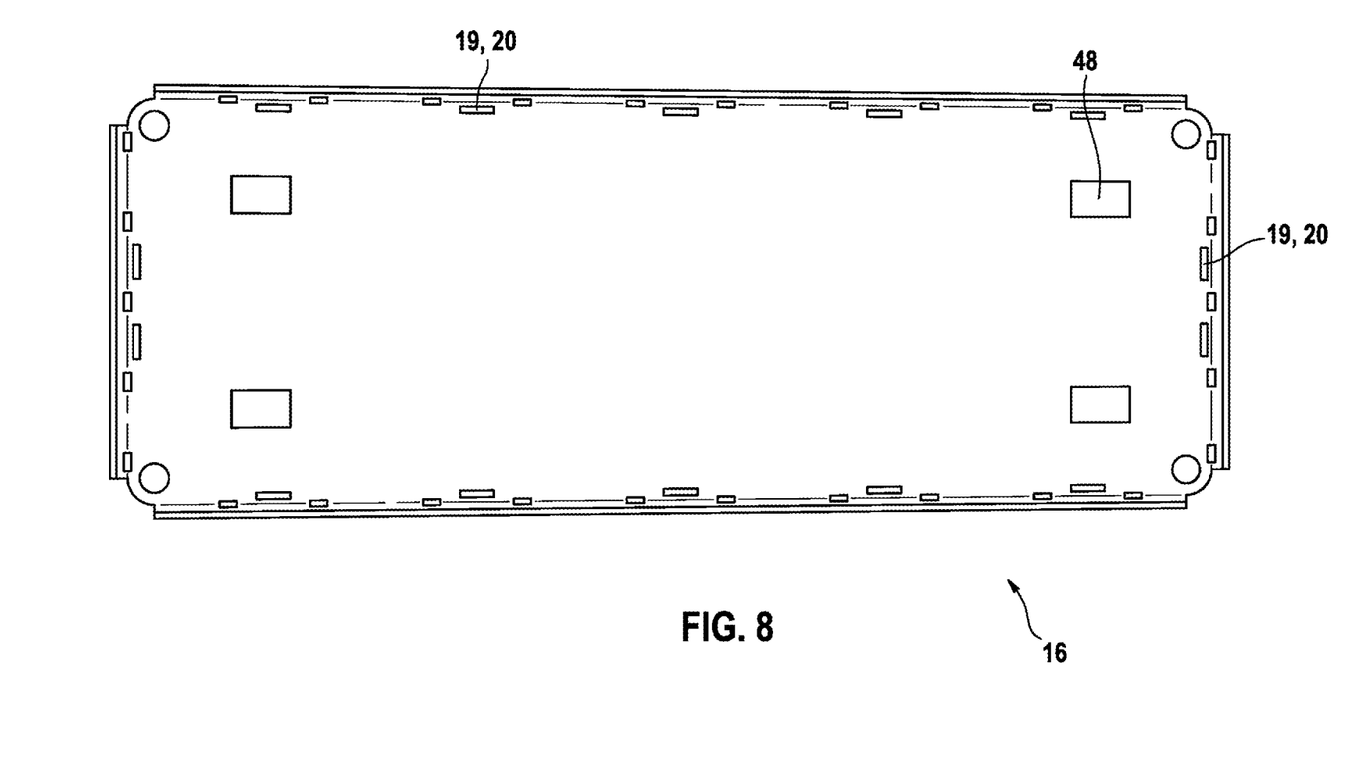
FIG. 8 illustrates a cover of the battery housing.

FIG. 8 illustrates a cover 16 of a battery housing 1.

As is evident in FIG. 8, the cover 16 comprises at least one fourth fastening element 19 that in particular is embodied as a through-going aperture 20 that extends through the cover 16.

The cover 16 furthermore comprises an aperture 48 that is embodied as a through-going aperture that extends through the cover 16 for the arrangement of a cell terminal that is not illustrated.

Figure 9:
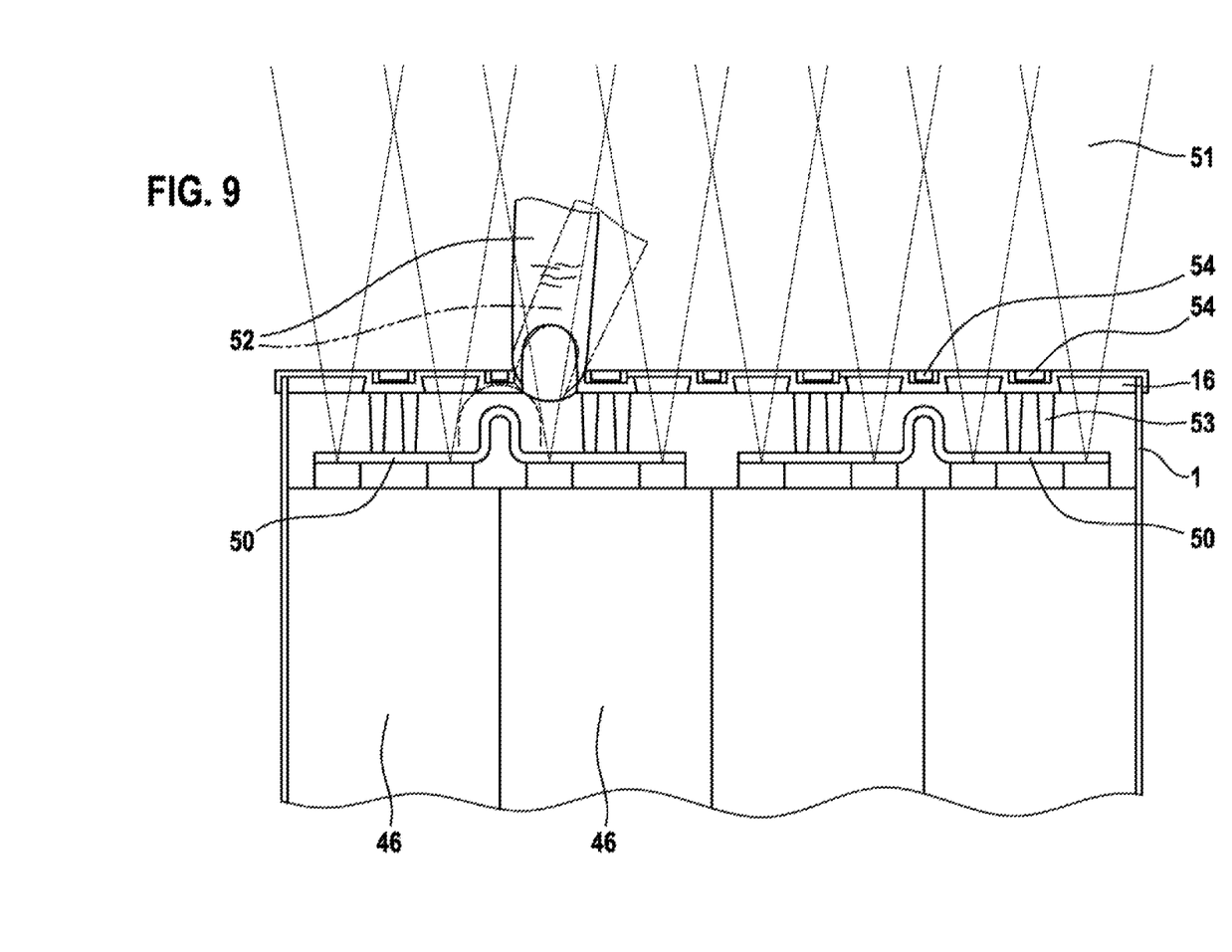
FIG. 9 illustrates a method for producing a connection of battery units and FIG. 10 illustrates in a side view an embodiment of a housing wall of a battery housing in accordance with the invention.

FIG. 9 illustrates a preferred method for producing an electrical connection between two battery units 46 that are arranged in the interior of the battery housing 1. For this purpose, a cell connector 50 is used. A welding method produces the electrical connection of a battery unit 46 and the cell connector 50. It is preferred that the battery cell housing 1 comprises a cover 16, wherein the battery housing 1 is connected, preferably in a reversible manner, to the cover 16 in particular prior to welding the cell connector 50 and the battery units 46. Furthermore, it is possible to produce the cell connection in an integrally bonded manner, in particular by way of a bonded connection.

It is preferred that, as is illustrated in FIG. 9, a spacing element 53 is arranged between the cell connector 50 and the cover 16. In particular, the spacing element 53 is embodied as a plastic material part. The spacing element 53 is used so that in the case of a deformation of the cover 16, said cover cannot come into physical contact with the cell connector 50. In particular, it can consequently be prevented that a user, in the form of the finger 52 that is illustrated in FIG. 9, can deform the cover 16 in the manner that the cover 16 makes physical contact with the cell connector 50. Furthermore, it is possible that the spacer 16 is used to fix the cell connector 50.

As is evident in FIG. 9, the welding method uses at least one laser beam 51. Furthermore, the cover 16 comprises at least one marking element 54, wherein the at least one marking element 54 is used for the purpose of determining the correct position of the at least one laser beam 51. As FIG. 9 illustrates, the at least one marking element 54 determines a region of the cover 16 on which a laser beam 51 is not to make contact.

Figure 10:
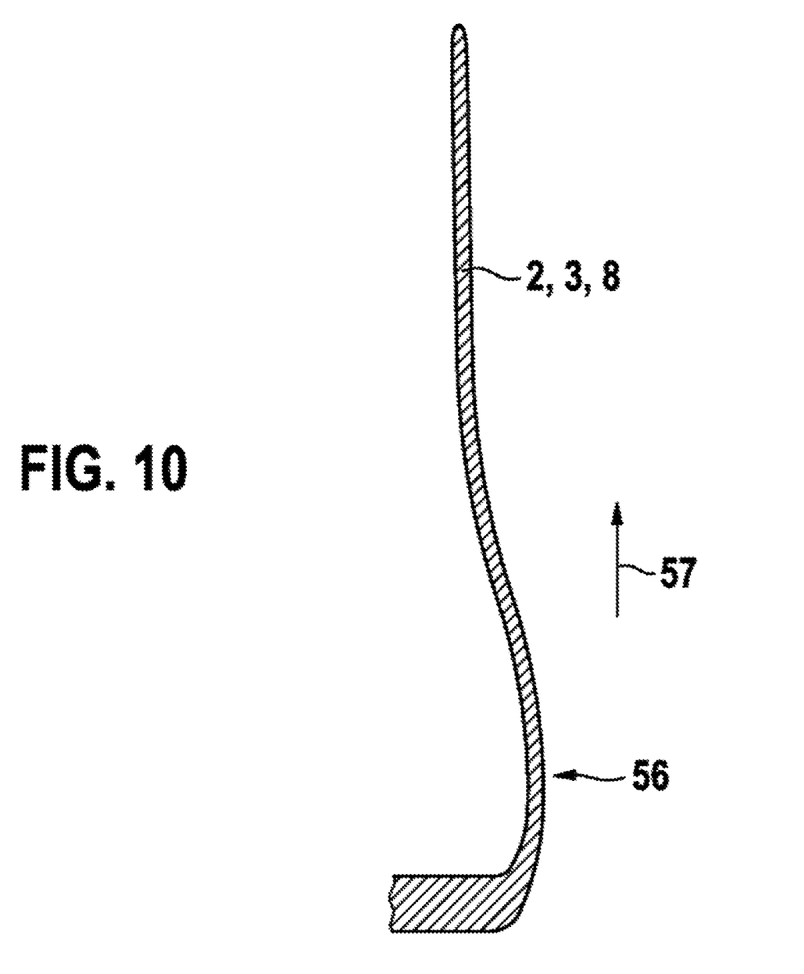

FIG. 10 illustrates in a sectional view one embodiment of a housing wall 2, 3, 8 of a battery housing 1 in accordance with the invention. A longitudinal direction 57 of the housing wall 2, 3, 8 is perpendicular to the drawing plane in the case of the drawing in FIG. 10. The housing wall 2, 3, 8 comprises a projection 56 that in particular is embodied in a rounded manner. The projection 56 advantageously extends in the longitudinal direction 57 over the entire housing wall 2, 3, 8. The projection 56 is used for the purpose of fastening two adjacent battery housings 1 or the battery housing 1 and a fastening wall of the battery pack to one another.

The battery housing in accordance with the invention can be used for batteries in mobile use, in particular in electric vehicles and E-bikes and for batteries for use in a stationary operation.

What is claimed is:

1. A battery housing for receiving at least one battery unit, the battery housing comprising:

a plate element made of metal or plastic, wherein the plate element was provided as a flat component and formed into the battery housing by bending the plate element at at least one bendable support line which includes a plurality of openings through the plate element or by material weakening, and the plate element comprises:

a first plate segment;

a first fastening element formed in the first plate segment, wherein the first fastening element is an opening extending through the first plate segment;

a second plate segment; and a second fastening element, wherein the second fastening element is a lamella element, wherein for a reversible connection of the first fastening element to the second fastening element, the plate member is bent along the bendable support line, and the lamella element is bent into an arrangement in the opening so that the first plate segment forms a first housing wall, and the second plate segment forms a second housing wall, and wherein the first fastening element and the second fastening element are connected to one another in a reversible manner to form a fixing arrangement of the first housing wall relative to the second housing wall by bending and arranging the lamella element in the opening.

2. The battery housing as claimed in claim 1, characterized in that the plate element includes a third plate segment, wherein the third plate segment is integrally or irreversibly connected to the first plate segment and/or to the second plate segment, the third plate segment forming a third housing wall, and wherein a third fastening element is formed by the first plate segment, the second plate segment, or the third plate segment, and the battery housing further includes a cover, the cover forming a fourth fastening element, wherein the fourth fastening element is reversibly connected to the third fastening element to fix the cover to the first, second, or third housing wall.

3. The battery housing as claimed in claim 2, characterized in that a cooling element is arranged on one of the first housing wall, the second housing wall, the third housing wall and the cover of the battery housing and the one of the first housing wall, the second housing wall, the third housing wall and the cover is embodied in a concave manner extending remote from the cooling element in such a manner that a contact surface is ensured between the one of the first housing wall, the second housing wall, the third housing wall and the cover and at least one battery unit that is received in the battery housing.

4. The battery housing as claimed in claim 2, characterized in that an at least in part reversibly deformable resilient element is arranged in the battery housing.

5. The battery housing as claimed in claim 4, characterized in that at least one of the first housing wall, the second housing wall, the third housing wall and the cover forms a stop element or a stop element is inserted into the battery housing, wherein the stop element is used to form a delimitation of deformation of the resilient element.

6. A battery having a battery housing as claimed in claim 1.

7. The battery as claimed in claim 6, characterized in that the battery housing comprises a third housing wall and a cover, wherein one of the first housing wall, the second housing wall, the third housing wall and the cover of the battery housing comprises at least one aperture for the arrangement of a cell terminal and a cell connector is arranged in the battery housing in such a manner that battery units that are received in the battery housing are electrically connected, wherein the connection of the cell connector to a battery unit is produced in an integrally bonded manner.

8. A plate member of metal and/or plastic material suitable for producing a battery housing as claimed in claim 1, wherein the plate member comprises at least one bend-supporting line that is embodied by a plurality of through-going apertures that extend through the plate member or by material weaknesses, and the plate member comprises a first plate segment that forms a first fastening element, and a second plate segment that forms a second fastening element, wherein the first fastening element, the second fastening element and the at least one bend-supporting line are embodied in such a manner that the plate member is bent along the at least one bend-supporting line to form a reversible connection of the first fastening element to the second fastening element.

9. A method for producing a battery housing as claimed in claim 8, the battery housing being configured to receive at least one battery unit, the method comprising:

providing a plate member of metal or plastic, wherein the plate member is a planar member, and wherein the plate element has at least one bending support line which is formed by a plurality of openings of material weaknesses, wherein the plate member has a first plate segment in which a first fastening element is formed as an opening extending through the first plate segment, and a second plate segment, which forms a second fastening element, wherein the second fastening element is a lamella element:

bending or deforming the lamella element;

bending the first sheet segment and the second sheet segment towards one another along at least one bend-supporting line; and arranging the lamella element into the opening to form a reversible connection of the first fastening element to the second fastening element so that the first plate segment forms a first housing wall and the second plate segment forms a second housing wall.

10. The method for producing a battery housing as claimed in claim 9, wherein the plate member embodies a third fastening element and the battery housing is connected to a cover that forms a fourth fastening element, characterized in that the battery housing is connected to a cover in a reversible manner by a reversible connection of the fourth fastening element to the third fastening element.

11. The battery as claimed in claim 6, characterized in that the battery housing comprises a third housing wall and a cover, wherein one of the first housing wall, the second housing wall, the third housing wall and the cover of the battery housing comprises at least one aperture for the arrangement of a cell terminal and a cell connector is arranged in the battery housing in such a manner that battery units that are received in the battery housing are electrically connected, wherein the connection of the cell connector to a battery unit is welded or bonded.

* * * * *